United States Patent [19]

Anderson et al.

[11] 4,082,198

[45] Apr. 4, 1978

[54] BALE HANDLING AND SHREDDING APPARATUS

[75] Inventors: Clifton W. Anderson, Long Lake, Minn.; John J. Kubik, Des Moines, Iowa; Tom G. Pollock, Blairstown, Iowa; Larry J. Schlict, Sac City, Iowa; Craig R. Wilcox, Vinton, Iowa

[73] Assignee: Iowa State University Research Foundation, Inc., Ames, Iowa

[21] Appl. No.: 654,086

[22] Filed: Feb. 2, 1976

[51] Int. Cl.² .......................... B02C 21/02; B60P 1/36
[52] U.S. Cl. ........................... 214/519; 214/78; 214/83.14; 214/DIG. 4; 239/651; 241/101.7; 241/186 R
[58] Field of Search ............... 214/75 T, 77 R, 77 P, 214/78, 80, 83.14, 83.34, 83.36, 130 C, 518, 519, DIG. 4; 119/60; 241/101.7, 186 R; 239/651, 668

[56] References Cited

U.S. PATENT DOCUMENTS

| | | | |
|---|---|---|---|
| 2,670,861 | 3/1954 | Fondriest et al. | 214/77 R |
| 2,680,529 | 6/1954 | Narvestad | 214/77 P |
| 2,703,184 | 3/1955 | Barrett | 214/518 X |
| 2,822,938 | 2/1958 | Ormsby | 214/77 P |
| 3,011,793 | 12/1961 | McElhinney et al. | 239/651 |
| 3,615,031 | 10/1971 | Schuler | 214/519 |
| 3,615,032 | 10/1971 | Zimmerman et al. | 214/83.14 X |
| 3,819,072 | 6/1974 | Reed | 214/83.36 |
| 3,941,265 | 3/1976 | Nunnally, Jr. | 214/518 X |
| 3,979,074 | 9/1976 | White et al. | 214/78 X |
| 3,999,674 | 12/1976 | Meitl | 241/101.7 |

FOREIGN PATENT DOCUMENTS 1,427,135   3/1976   United Kingdom ............... 214/83.14

Primary Examiner—Drayton E. Hoffman
Assistant Examiner—Carl Rowold
Attorney, Agent, or Firm—Rudolph L. Lowell

[57] ABSTRACT

The apparatus of the invention is capable of loading, transporting and shredding a large bale of material. The apparatus is of a vehicle trailer type and is equipped with a box or housing unit type that is open only at the rear side of the vehicle. The apparatus has a combination tailgate and lift structure which functions as a fork lift to load and move a bale of material into the housing unit and, after such delivery, to automatically function as a tail gate to close the rear side of the housing unit. A floor conveyor within the housing moves the baled material forwardly into the path of a bale shredder which is of a flail type. The shredded material is then blown or moved by the shredder into an auger at the forward end of the housing unit for discharge into a feed bunk or storage bin.

2 Claims, 7 Drawing Figures

4,082,198

BALE HANDLING AND SHREDDING APPARATUS

SUMMARY OF THE INVENTION

The bale handling apparatus of this invention is of a simple construction and efficient in operation to pick up and lift baled material into a housing unit the bale receiving or rear side of which is closed by the lift structure concurrently with the delivery of the bale onto a floor conveyor. The floor conveyor moves the bale forwardly into a flail type shredder located within and extended transversely of the housing unit and rotatable in a direction to throw the shredded material forwardly into a transversely extended discharge auger arranged within the housing structure forwardly of the shredder. The apparatus is capable of easily handling large bales weighing about a ton or more for either transport to a storage station or to a feed lot to be shredded.

DETAILED DESCRIPTION OF THE INVENTION

Figure 1:
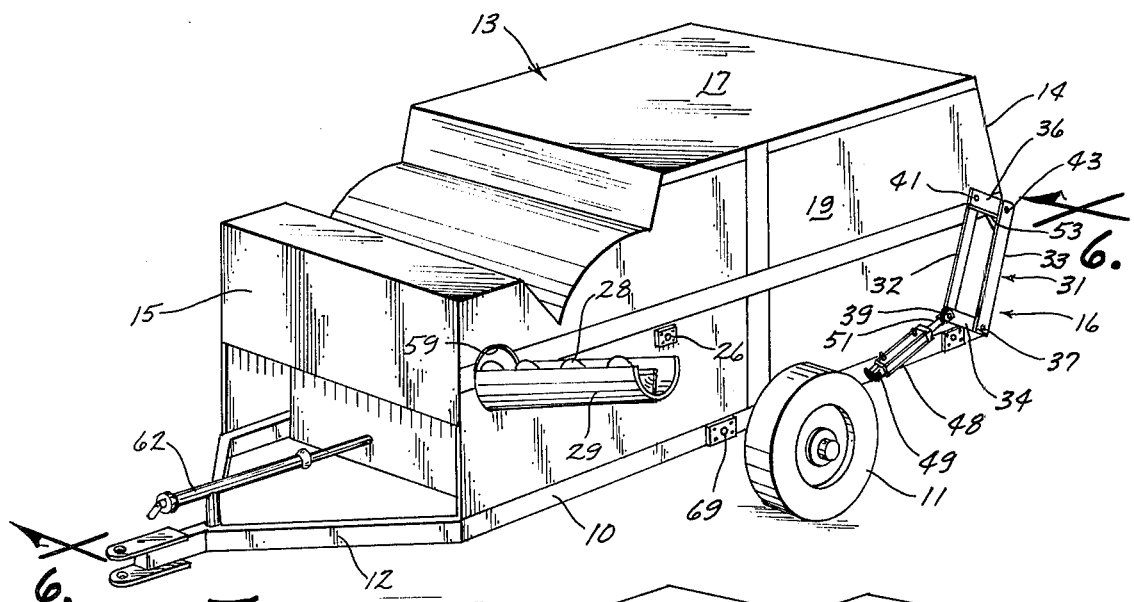
FIG. 1 is a front perspective view of the bale handling apparatus of this invention.
Figure 2:
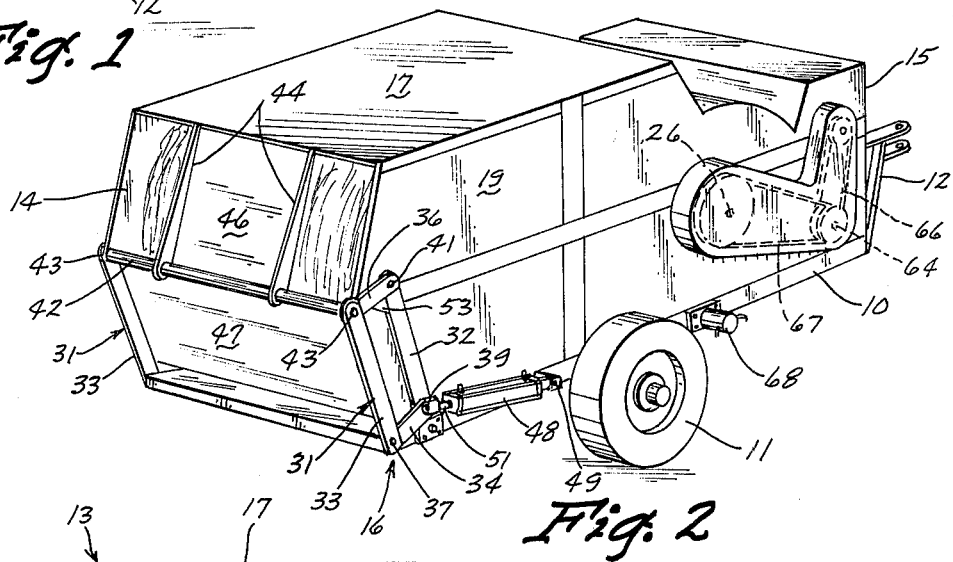
FIG. 2 is a rear perspective view of the apparatus.

Referring to FIGS. 1 and 2 of the drawings, the bale handling apparatus of this invention is shown as being of a trailer type and including a main frame 10 provided with a pair of ground wheels 11 and a tongue structure 12 connectible with a usual farm tractor (not shown) having a usual power take-off shaft and oil pump and reservoir assembly. Mounted on the main frame 10 is a vehicle box or housing unit 13 which is closed except for an open bale-receiving or rear side 14. A bale lift structure, indicated generally as 16, is movably supported at the rear end of the main frame 10 for movement from a lowered bale loading position to an uppermost bale release position wherein it functions as a closure or tail gate for the rear side 14 of the housing unit (FIGS. 2 and 3).

The housing unit 13 (FIG. 6 and 7) has a front wall 15, top and bottom walls 17 and 18, respectively, of generally irregular shapes so as to form with the sidewalls 19 a rear bale transport chamber 21, an intermediate shredding chamber 22, and a forward shredded material discharge chamber 23. Located within the bale transport chamber 21 is a longitudinally extended endless floor type conveyor 24 of a usual slat or raddle type for moving a bale supported thereon forwardly into the shredding chamber 22. Located within the shredding chamber is a shredder 25 of a flail type and comprised of a shaft 25 rotatably carried in the side walls 19 and equipped with a plurality of axially spaced radially extended chain flails 27. A transverse auger 28 in the discharge chamber 23 receives shredded material from the shredder 25 for conveying such material into a discharge chute 29 (FIG. 1) for dispensing at a feeding station or storage bin. The bale lift structure 16 includes a pair of parallel link assemblies 31 spaced transversely of the frame 10 to receive a bale lengthwise therebetween. Each linkage assembly 31 (FIG. 3) is comprised of an upper and lower links 32 and 33, respectively, pivotally interconnected by end links 34 and 36 hereinafter to be referred to as the front link and the rear link, respectively. The linkage assemblies 31 are oppositely arranged at the rear end of the vehicle main frame 10 with a lower link 33 being pivotally supported at 37 for up and down movement rearwardly of the frame 10. A front connecting link 34 has its lower end pivoted on the pivot 37 and its upper end pivotally connected at 39 to the front end of an upper link 32. The rear end of an upper link is pivotally connected at 41 to the upper end of a rear end link 36.

The lower end of a rear end link 36 (FIG. 2) of the linkage assemblies 31 is rigidly secured to a transverse beam member 42, the opposite ends of which are pivotally connected at 43 to the rear ends of the lower links 33. It is seen, therefore, that the linkage assemblies 31 project rearwardly from the vehicle frame 10 in a transversely spaced relation with their front ends supported on the frame 10 at the pivots 37 and their rear ends connected together by the transverse beam member 42.

Figure 3:
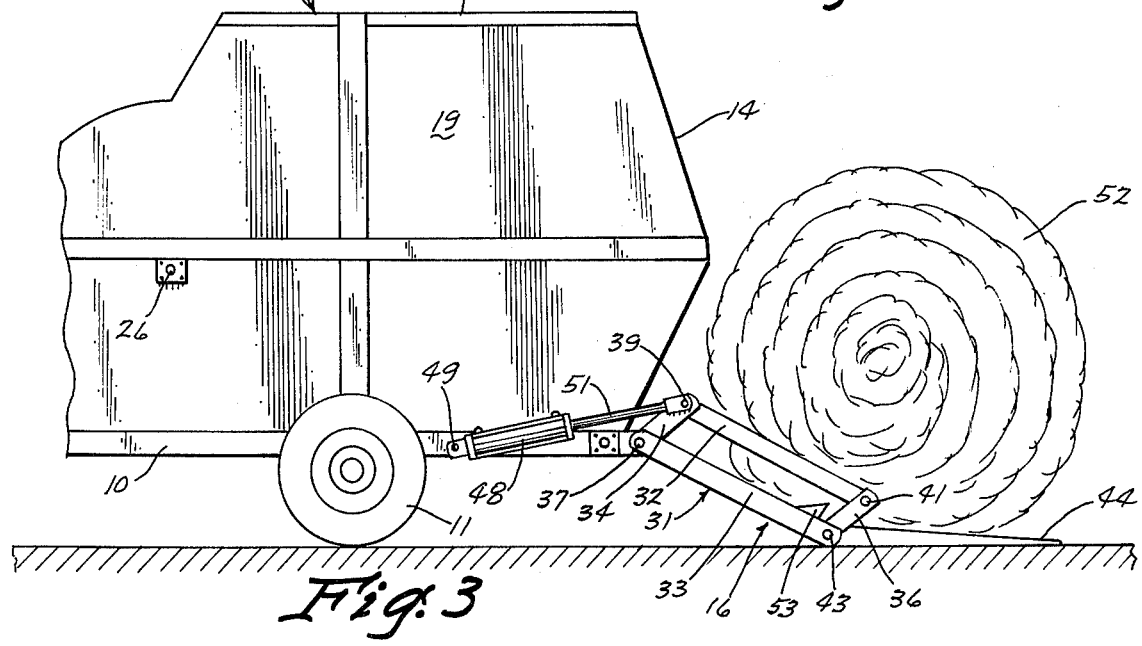
FIG. 3 is a side elevational view of the rear portion of the apparatus showing the bale lift structure in a lowered bale loading position.

A pair of fork members 44 (FIGS. 2 and 3) are secured to the central portion of the transverse beam member 42 in a spaced relation longitudinally thereof so as to project rearwardly from the beam member when the linkage assemblies 31 are in their lowered positions shown in FIG. 3. The area included between the spaced fork members 44 is closed by a plate member 46 suitably secured as by weldments or like means to the beam member 42 and fork members 44. In a like manner the area between the linkage assemblies 31 is closed by a plate member 47 secured to the lower links 33, all for a purpose to appear later.

To pivotally raise and lower the lift structure 16 there is provided a pair of power units 48 (FIGS. 2 and 7) illustrated as double acting hydraulic cylinder units extended longitudinally of and arranged at opposite sides of the vehicle frame 10. Each cylinder unit 48 has its forward end pivotally supported at 49 on the frame 10 while the piston rods 51 for the units 48 are connected to adjacent linkage assemblies 31 at the pivots 39.

As a result of the rigid securement of the rear end links 36 with the transverse beam 42 the links 36 and forks 44 are pivotally movable together as a unit relative to the pivots 43. As a result, when the forks 44 are in their lowered positions shown in FIG. 3, the forks are permitted to float so as to follow the contour of the ground surface for reception under a bale, indicated at 52, when the bale is being loaded. During the floating action of the forks 44 on the ground surface the resultant pivotal movement of the rear end links 36 relative to the pivots 43 is permitted by the relaxed or idle condition of the piston rods 51 in the extended positions therefor.

Figure 4:
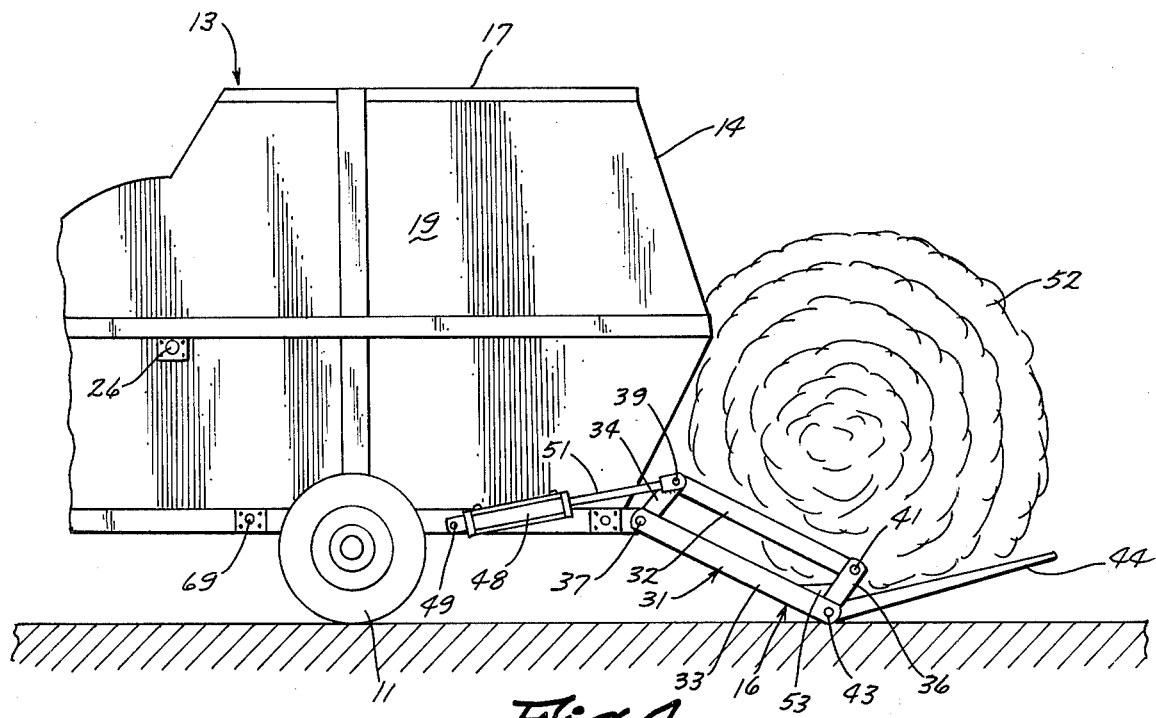
FIG. 4 is illustrated similarly to FIG. 3 and shows the bale lift structure partially elevated with a bale loaded there.

On retraction of the piston rods 51 to elevate the bale 52 the upper links 32 function as lift arms (FIG. 3) so as to initially be moved longitudinally relative to the lower links 33. This relative movement continues until the rear end links 36 engage stop members 53 carried on the lower links 33 adjacent the rear ends thereof. This engagement of the rear end links 36 with corresponding stop members 53 (FIG. 4) stops any further relative longitudinal movement between the upper links 32 and lower links 33 whereby the linkage assemblies 31 are pivotally movable to their upper positions, shown in FIG. 5, as rigid lift arm units pivotally movable about the pivots 37.

During the upward pivotal movement of the linkage assemblies 31 the bale 52 is rolled downwardly, by the action of gravity, off of the forks 44 and onto the plate member 47, carried between the lower links 33, for delivery onto the floor conveyor 24 located in the bale transport chamber 21 of the housing unit 13.

Figure 5:
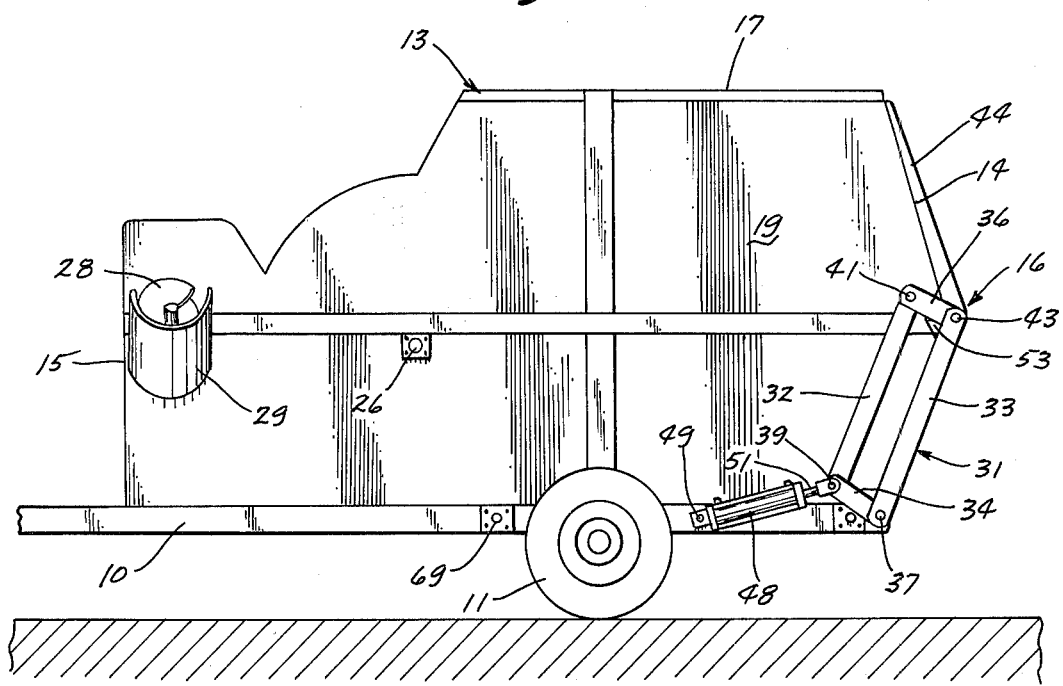
FIG. 5 is illustrated similarly to FIG. 3 and shows the bale lift structure in its uppermost moved position wherein it functions as a rear wall or gate for closing the housing unit.
Figure 6:
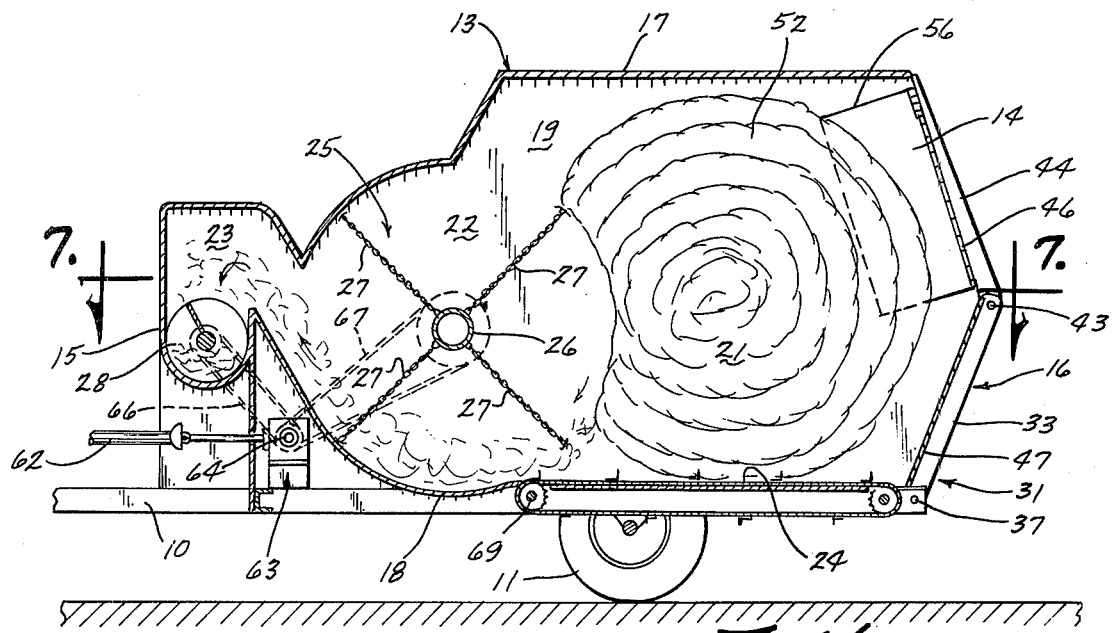
FIG. 6 is a longitudinal sectional view of the apparatus taken substantially along the line 6—6 of FIG. 1.
Figure 7:
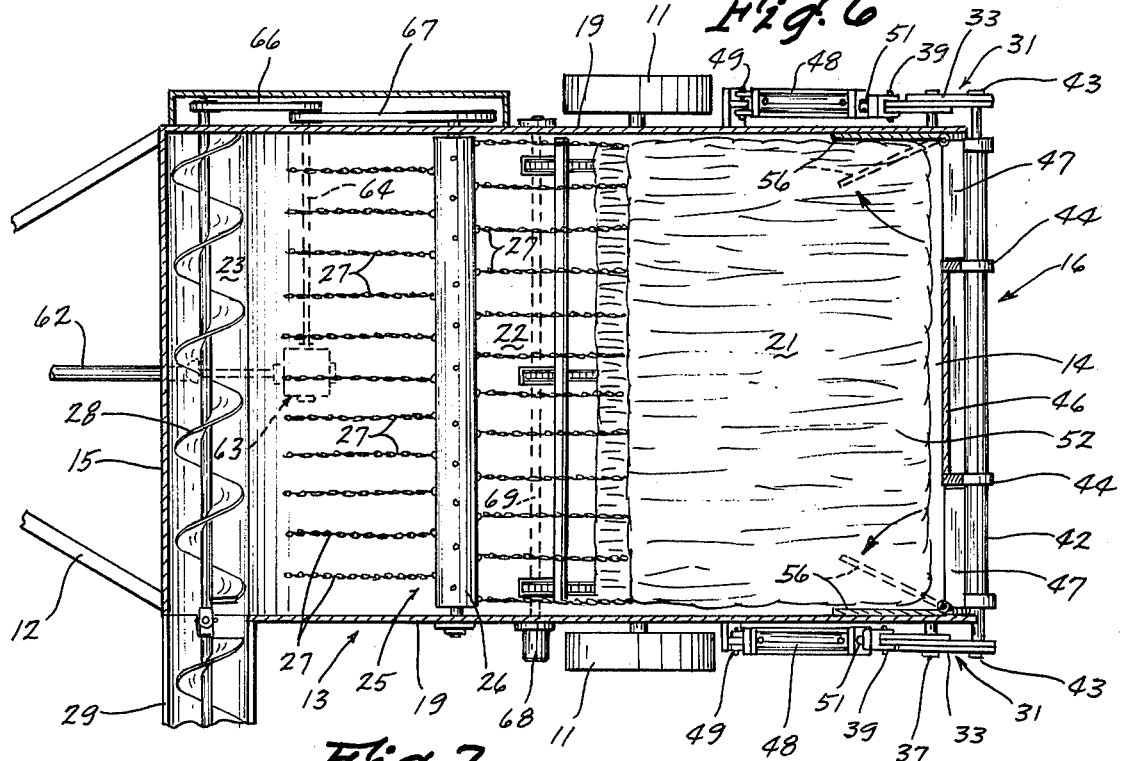
FIG. 7 is a transverse sectional view of the apparatus as seen along the line 7—7 in FIG. 6.

In the uppermost moved positions of the linkage assemblies 31, and as shown in FIGS. 2, 5, and 6, the open rear side 14 of the housing unit 13 is substantially closed by the covering action of the plate members 46 and 47 carried on the fork members 44 and lower links 33, respectively. In this respect it is seen that the areas at opposite sides of the fork members 44 and above the transverse beam member 42 remain open. These open areas are closed by swinging doors or gates 56 which are pivotally supported for yieldable swinging movement on the rear edges of the side walls 19 of the housing unit 13. Thus on delivery of the bale 52 into the rear or receiving side 14 of the housing unit 13 the gates 56 are swung inwardly by the bale against the inner surfaces of adjacent side walls, as indicated for a gate 56 in FIG. 6, and are retained by the bale in such open positions until after the bale has passed out of engagement with the gates. At such time, the gates 56 are spring actuated to closed positions in substantial alignment with the cover plate 46 carried on the fork members 44. Thus, during substantially the complete shredding operation on the bale 52 the housing unit 13 is completely enclosed.

In handling a ground supported bale 52 the trailer vehicle is backed up to one side of the bale and the lift structure 16 moved to its lowered position shown in FIG. 3. With the forks 44 in floating engagement with the ground surface the trailer is backed up so as to position the bale on the forks and between the linkage assemblies 31. On retraction of the piston rods 51 of the cylinder units 48 the bale is initially tipped upwardly and forwardly by the forks 44 until the rear end links 36 are engaged by the stop members 53. The linkage assemblies 31 and fork members 44 are then pivotally moved upwardly together as an integral assembly to the uppermost position of the lift structure 16 shown in FIGS. 5 and 6 to provide for the delivery of the bale 52 onto the floor conveyor 24.

The bale 52, supported on the floor conveyor 24, is advanced from the transport chamber 21 into the shredding chamber 22 where it is progressively engaged and shredded by the cutting action of the rotating chain flails 27. As the bale is shredded, the shredded material is moved by the shredder 25 by both a blowing and conveying action directly into the discharge chamber 23 where it is picked up by the discharge auger 28. The shredded material is then conveyed transversely of the housing unit 13 and outwardly therefrom (FIG. 1), through an outlet opening 59 in the housing unit 13, into a chute 29 for discharge into a feed bunk or storage bin.

The shredder 25 and discharge auger 28 are driven from the power takeoff of a usual farm tractor (not shown) which is connectible to a drive shaft 62 (FIGS. 6 and 7) that forms part of a gear reduction unit 63 carried at the front end of the vehicle frame 10. An output shaft 64 of the gear reduction unit 63 is connected in a driving relation with the discharge auger 28 and shredder 25 through chain and gear assemblies 66 and 67, respectively.

The floor conveyor 24 is driven in a usual manner by a hydraulic motor 68 mounted on the vehicle frame 10 in direct driving relation with a front drive roller 69 of the conveyor 24. Oil under pressure is supplied to the motor 68 and to the hydraulic cylinder units 48 from the oil pump and reservoir unit (not shown) with which the towing tractor is equipped.

Although the invention has been described with respect to a preferred embodiment thereof it is to be understood that it is not to be so limited since changes and modifications can be made therein which are within the full intended scope of this invention as defined by the appended claims.

We claim:

1. Apparatus for handling and shredding a baled fibrous material comprising:
    (a) a portable frame,
    (b) a housing unit carried by said frame having a top wall, a bottom wall, transversely spaced side walls, a front wall and an open rear side, forming within said housing a rear bale transport chamber means, an intermediate bale shredding chamber means and a front material discharge chamber means, with one of said side walls having an outlet opening at said discharge chamber means,
    (c) a conveyor means in said bale transport chamber means extended longitudinally of said bottom wall for moving a bale supported thereon forwardly into said bale shredding chamber means,
    (d) a transversely extended bale shredding flail means including a transverse shaft rotatably carried on and between said side walls for rotation about a transverse axis generally vertically centered within said bale shredding chamber means and a plurality of flails axially spaced on and radially extendible from said shaft for rotation of the free ends of said flails adjacent said bottom wall,
    (e) means for rotating said bale shredding flail means in a direction to move the free ends of said flails downwardly into the baled material advanced into said bale shredding chamber means by said conveyor means and forwardly along said bottom wall for movement of shredded material forwardly along said bottom wall into said discharge chamber means,
    (f) a transversely extended conveyor means in said discharge chamber means for receiving shredded material from said bale shredding flail means having a discharge end at said outlet opening, and
    (g) a bale lift structure movably mounted at the rear end of said frame for movement from a lowered bale loading position extended rearwardly from said frame to an elevated position for unloading a bale through said open rear side onto said conveyor means; said lift structure comprising:
        (1) a pair of transversely spaced lift arm units,
        (2) means pivotally supporting the front ends of said lift arm units on said frame for up and down pivotal movement of the rear ends thereof about a common axis extended transversely of the frame, (3) a fork unit projected rearwardly from said lift arm units in the lowered positions therefor and including a pair of fork members spaced transversely of said frame, (4) a first plate means secured to and extended between said fork members over the longitudinal lengths thereof, and (5) a second plate means secured to and extended between said lift arm units over the longitudinal lengths thereof, (6) said first plate means and second plate means comprising a closure for the open rear side of said housing unit when the lift structure is in the elevated position therefor.

2. Apparatus for handling and shredding a baled fibrous material comprising:

(a) a portable frame, (b) a housing unit carried by said frame having a top wall, a bottom wall, transversely spaced side walls, a front wall and an open rear side, forming within said housing a rear bale transport chamber means, an intermediate bale shredding chamber means and a front material discharge chamber means, with one of said side walls having an outlet opening at said discharge chamber means, (c) a conveyor means in said bale transport chamber means extended longitudinally of said bottom wall for moving a bale supported thereon forwardly into said bale shredding chamber means, (d) a transversely extended bale shredding flail means including a transverse shaft rotatably carried on and between said side walls for rotation about a transverse axis generally vertically centered within said bale shredding chamber means and a plurality of flails axially spaced on and radially extendible from said shaft for rotation of the free ends of said flails adjacent said bottom wall, (e) means for rotating said bale shredding flail means in a direction to move the free ends of said flails downwardly into the baled material advanced into said bale shredding chamber means by said conveyor means and forwardly along said bottom wall for movement of shredded material forwardly along said bottom wall into said discharge chamber means, (f) a transversely extended conveyor means in said discharge chamber means for receiving shredded material from said bale shredding flail means having a discharge end at said outlet opening, and (g) a bale lift structure movably mounted at the rear end of said frame for movement from a lowered bale loading position extended rearwardly from said frame to an elevated position for unloading a bale through said open rear side onto said conveyor means, said lift structure comprising:

(1) a pair of transversely spaced lift arm units, (2) means pivotally supporting the front ends of said lift arm units on said frame for up and down pivotal movement of the rear ends thereof about a common axis extended transversely of the frame, (3) a fork unit projected rearwardly from said lift arm units in the lowered positions therefor, (4) means pivotally connecting the forward end of said fork unit with the rear ends of said lift arm units, (5) a first cover means secured to said lift arm units, and (6) a second cover means secured to said fork unit, (7) said first cover means and said second cover means constituting a closure for the open rear side of said housing unit when the bale lift structure is in the elevated position therefor.

* * * * *